United States Patent
Bruns

(10) Patent No.: US 12,481,362 B2
(45) Date of Patent: Nov. 25, 2025

(54) SYSTEMS AND METHODS FOR AN ASSISTIVE BRAIN COMPUTER INTERFACE FOR DIGITAL STYLUS INPUTS

(71) Applicant: Nicholas Gordon Bruns, Baltimore, MD (US)

(72) Inventor: Nicholas Gordon Bruns, Baltimore, MD (US)

(*) Notice: Subject to any disclaimer, the term of this patent is extended or adjusted under 35 U.S.C. 154(b) by 0 days.

(21) Appl. No.: 19/020,650

(22) Filed: Jan. 14, 2025

(65) Prior Publication Data

US 2025/0238080 A1   Jul. 24, 2025

Related U.S. Application Data

(60) Provisional application No. 63/623,877, filed on Jan. 23, 2024.

(51) Int. Cl.
G06F 3/01 (2006.01)
G06F 3/0354 (2013.01)

(52) U.S. Cl.
CPC .......... G06F 3/015 (2013.01); G06F 3/03545 (2013.01)

(58) Field of Classification Search
CPC .............................. G06F 3/015; G06F 3/03545
See application file for complete search history.

(56) References Cited

U.S. PATENT DOCUMENTS

| | | | | |
|---|---|---|---|---|
| 10,019,078 B2* | 7/2018 | Kim | ..................... | G06F 3/03545 |
| 2005/0137493 A1* | 6/2005 | Ryu | ........................ | G06F 3/015 |
| | | | | 600/544 |
| 2007/0104369 A1* | 5/2007 | Weatherhead | ......... | H04H 60/59 |
| | | | | 382/173 |
| 2007/0140562 A1* | 6/2007 | Linderman | ........ | G06V 30/1423 |
| | | | | 382/187 |
| 2009/0264713 A1* | 10/2009 | Van Loenen | ........... | G06F 3/011 |
| | | | | 600/301 |
| 2012/0172682 A1* | 7/2012 | Linderman | ............ | A61B 5/389 |
| | | | | 600/300 |
| 2013/0158883 A1* | 6/2013 | Hasegawa | ............... | G06F 3/015 |
| | | | | 702/19 |
| 2014/0368474 A1* | 12/2014 | Kim | ..................... | A61B 5/1122 |
| | | | | 345/179 |
| 2015/0148948 A1* | 5/2015 | Singh | ..................... | B43K 29/08 |
| | | | | 901/30 |
| 2015/0193134 A1* | 7/2015 | Hong | .................... | G06F 3/0488 |
| | | | | 715/781 |
| 2016/0054821 A1* | 2/2016 | Kim | ...................... | G06F 3/0442 |
| | | | | 345/179 |
| 2018/0004406 A1* | 1/2018 | Jung | .................. | G06V 30/1423 |

(Continued)

FOREIGN PATENT DOCUMENTS

| | | | | |
|---|---|---|---|---|
| CA | 2942852 A1 * | 9/2014 | ............. | G16H 40/67 |
| WO | WO-2024226512 A1 * | 10/2024 | | |

*Primary Examiner* — William Lu
(74) *Attorney, Agent, or Firm* — Scale LLP

(57) ABSTRACT

Disclosed are methods, systems and non-transitory computer readable memory for an assistive brain computer interface. For instance, a system may include a set of sensors, wherein the set of sensors are configured to obtain sensor data; a stylus configured to collect stroke data; and a user device. The user device may be configured to: receive the stroke data from the stylus and the sensor data from the set of sensors; generate renders of strokes based on the stroke data and the sensor data; and display the renders of the strokes to a user.

20 Claims, 6 Drawing Sheets

(56) References Cited

U.S. PATENT DOCUMENTS

| | | | |
|---|---|---|---|
| 2018/0024656 A1* | 1/2018 | Kim | G06F 3/03545 |
| | | | 345/174 |
| 2018/0341400 A1* | 11/2018 | Kim | G06F 3/04883 |
| 2018/0349337 A1* | 12/2018 | Cheng | G06F 3/04845 |
| 2019/0012027 A1* | 1/2019 | Park | G06F 3/017 |
| 2019/0187823 A1* | 6/2019 | Kake | G06V 40/37 |
| 2019/0286894 A1* | 9/2019 | Maruoka | G06V 30/1423 |
| 2021/0064135 A1* | 3/2021 | Shenoy | G06N 3/044 |
| 2021/0124422 A1* | 4/2021 | Forsland | G06N 20/00 |
| 2022/0091673 A1* | 3/2022 | Fujimaki | A61B 5/18 |
| 2023/0072423 A1* | 3/2023 | Osborn | G16H 20/30 |
| 2025/0060782 A1* | 2/2025 | Mahmud | H01Q 1/273 |

\* cited by examiner

SYSTEMS AND METHODS FOR AN ASSISTIVE BRAIN COMPUTER INTERFACE FOR DIGITAL STYLUS INPUTS

CROSS-REFERENCE TO RELATED APPLICATION(S)

This application claims the benefit of U.S. Provisional Application No. 63/623,877, filed Jan. 23, 2024.

The contents of each of the above referenced applications are hereby incorporated by reference in its entirety.

TECHNICAL FIELD

Various aspects of the present disclosure relate generally to systems and methods for an assistive brain computer interface and, more particularly, to systems and methods for an assistive brain computer interface for digital stylus inputs.

BACKGROUND

Digital art creation is a rapidly evolving field that leverages technology to facilitate the creation of visual art using digital tools and platforms. This field encompasses a wide range of artistic practices, including digital painting, graphic design, digital illustration, and visual effects (VFX) creation, among others. These practices are typically performed using specialized software suites such as Photoshop, SAI, or GIMP, which provide a variety of digital tools and features that emulate traditional artistic implements and techniques.

One of the primary tools used in digital art creation is the pen input device, also known as a stylus. This device is designed to track the position and pressure of its tip in a two-dimensional space, allowing artists to create digital strokes that mimic the look and feel of traditional pen or brush strokes. The pen input device typically works in conjunction with a digitizer, which consists of a point matrix array embedded underneath a textured cover or a display panel. The digitizer tracks the position of the charged pen tip, while the pen tracks the pressure exerted on its tip with a force sensor. The data collected by the pen and the digitizer is then interpreted by the software to create a digital representation of the artist's stroke.

While digital art creation tools have greatly expanded the possibilities for artistic expression, they also present new challenges. One of the primary challenges is the inherent latency and lack of tactile feedback associated with digital input devices. Unlike traditional art mediums, where the artist has direct physical contact with the art material, digital art creation involves an indirect interaction mediated by the input device and the software. This can make the process of creating digital art feel less intuitive and more difficult to control, particularly for artists who are accustomed to traditional art mediums.

Another challenge is the issue of involuntary movements, such as tremors or twitches, which can interfere with the precision of the digital strokes. These involuntary movements can be particularly problematic for artists with motor neuron disorders, such as tardive dyskinesia, ALS, or cerebral palsy. Even for artists without such disorders, the lack of physical resistance and tactile feedback in digital art creation can make it more difficult to control the pen input device, leading to unintended strokes or variations in stroke pressure.

Brain-computer interfaces (BCIs) are a type of technology that allows for direct communication between the brain and an external device. BCIs work by monitoring and interpreting the electrical activity of the brain, typically through electroencephalography (EEG), a technique that measures the electrical signals produced by the brain's neurons. BCIs have been used in a variety of applications, from medical and rehabilitation therapies to gaming and entertainment. However, their potential use in augmenting digital art creation has not been fully explored.

The present disclosure is directed to overcoming one or more of these above-referenced challenges.

SUMMARY OF THE DISCLOSURE

According to certain aspects of the disclosure, systems, methods, and computer readable memory are disclosed for an assistive brain computer interface.

In some cases, a system for an assistive brain computer interface may include: a set of sensors, wherein the set of sensors are configured to obtain sensor data; a stylus configured to collect stroke data; and a user device. The user device may be configured to: receive the stroke data from the stylus and the sensor data from the set of sensors; generate renders of strokes based on the stroke data and the sensor data; and display the renders of the strokes to a user.

In some cases, a method for operating an assistive brain computer interface may include: receiving stroke data from a user interface; receiving a real-time user EEG stream from a neural sensor; determining whether a stroke of a user was intentional based on the EEG stream; rendering an initial stroke for the stroke input if the stroke was determined to be intentional; determining whether the user is satisfied with the initial stroke based on the EEG stream; and modifying the initial stroke based on the determination of user satisfaction.

In some cases, a system for an assistive brain computer interface may include: a set of sensors including at least a neural sensor; an input stylus; and a user device including a user interface and a stroke engine. The user interface may be configured to interact with the input stylus. The stroke engine may be configured to: receive stroke data from the user interface and/or the input stylus; receive a real-time user EEG stream from the neural sensor; determine whether a stroke of a user was intentional based on the EEG stream; render an initial stroke for the stroke input if the stroke was determined to be intentional; determine whether the user is satisfied with the initial stroke based on the EEG stream; and modify the initial stroke based on the determination of user satisfaction.

Additional objects and advantages of the disclosed technology will be set forth in part in the description that follows, and in part will be apparent from the description, or may be learned by practice of the disclosed technology.

It is to be understood that both the foregoing general description and the following detailed description are exemplary and explanatory only and are not restrictive of the disclosed technology, as claimed.

BRIEF DESCRIPTION OF THE DRAWINGS

The accompanying drawings, which are incorporated in and constitute a part of this specification, illustrate various exemplary aspects and together with the description, serve to explain the principles of the disclosed technology.

DETAILED DESCRIPTION

In general, the present disclosure is directed to methods and systems for brain computer interfaces for digital stylus inputs. As discussed in detail herein, systems of the present disclosure may include or communicate with a set of sensors. The set of sensors are configured to obtain sensor data. In some cases, the sensor data may be different modalities of sensor data, such as EEG, EMG, or camera data. In some cases, the systems of the present disclosure may include or communicate with a stylus configured to collect stroke data. In some cases, the systems of the present disclosure may be a software module (e.g., stroke engine) installed on a user device. The stroke engine may receive the stroke data from the stylus and the sensor data from the set of sensors. The stroke engine may generate renders of strokes based on the stroke data and the sensor data, and display the renders of the strokes to a user.

In some cases, the stroke engine may modify (pre-or-post) display of a render to the user. For instance, based on a determination of user attention, intention, satisfaction or frustration, the stroke engine may modify a render of a stroke (or keep a stroke the same). In some cases, the stroke engine may roll back a stroke, undo the stroke entirely, and/or provide options for a user to select a different stroke rendering.

Thus, methods and systems of the present disclosure may be improvements to computer technology and/or [other technology].

Environment

Figure 1:
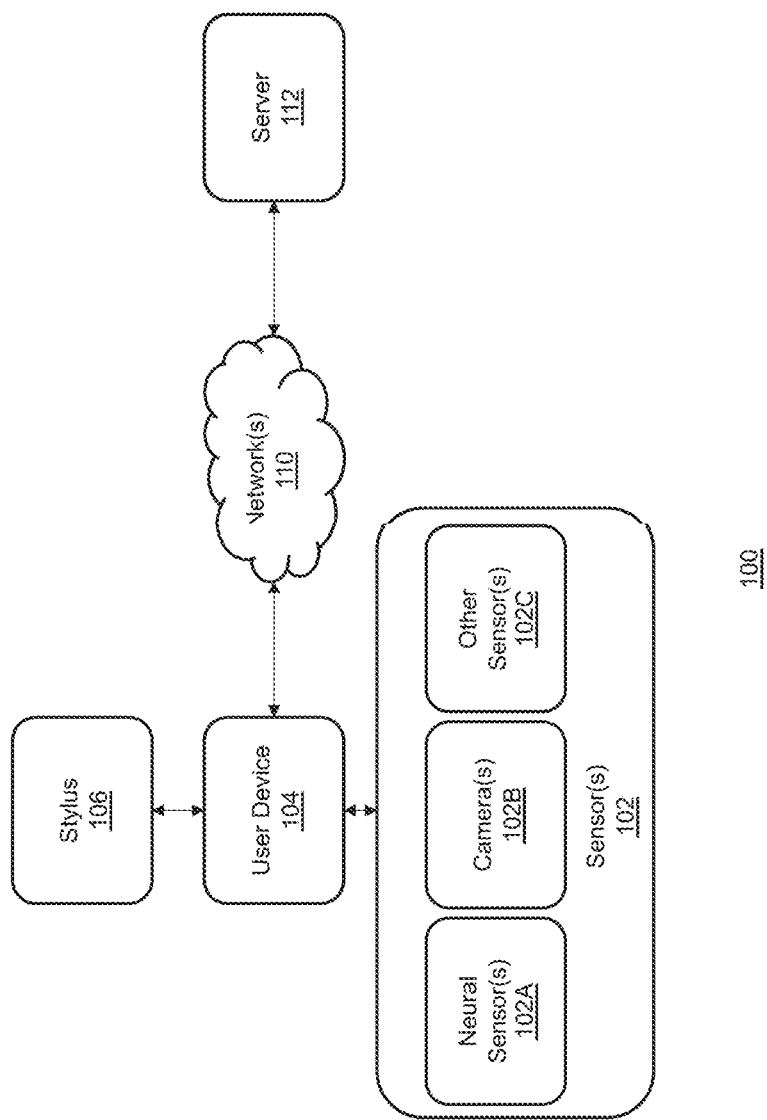
FIG. 1 depicts an example environment for an assistive brain computer interface.

FIG. 1 depicts an example environment for an assistive brain computer interface. The environment 100 may include a user device 104, sensor(s) 102, and a stylus 106. In some cases, the environment 100 may include network(s) 110 and a server 112.

The user device 104 may be a personal computing device, such as a cell phone, a tablet, a laptop, or a desktop computer. In some cases, the user device 104 may be an extended reality (XR) device, such as a virtual reality device, an augmented reality device, a mixed reality device, and the like. In some cases, the user device 104 may be associated with a user. The user may have a user account associated with the server 112. Additional features of the user device 104 and interactions with other devices are described herein.

The sensor(s) 102 may include one or combinations of: neural sensor(s) 102A, camera(s) 102B, and other sensor(s) 102C. The sensor(s) 102 may obtain different modalities of sensor data. Generally, the sensor(s) 102 may obtain user intention and/or satisfaction signals using neural, facial, or eye tracking, and the like.

The neural sensor(s) 102A may be a neural signal sensor (e.g., EEG). For instance, the neural sensor(s) 102A may be an EEG sensor. The EEG sensor may be a wearable EEG headset that is configured to monitor and transmit real-time electrophysiological (EEG) data from the user to the user device 104 (e.g., the stroke engine 206). The neural sensor(s) 102A may collect and transmit frequency binned multichannel information on intensity and, where necessary, a raw packet stream of voltage in the time domain. The neural sensor(s) 102A may transmit the real-time EEG data by wired (e.g., USB, ethernet, and the like) or wirelessly (e.g., WIFI, Bluetooth, and the like) with the user device 104. In some cases, the data may be transmitted directed to the user device 104, or via a peripheral processor device connected to the user device 104. In some cases, the user device 104 (or the peripheral processor device) may parse the transmitted packets of the real-time EEG data.

The camera(s) 102B may be configured to record a user's face. The camera(s) 102B may monitor the user's face and/or eyes of the user. The camera(s) 102B may determine, based on the monitored face/eyes, user attention, intention, satisfaction (e.g., with a stroke), and/or eye tracking (collectively, "camera-based data").

The user device 104 (e.g., the stroke engine 206) may use EEG data and/or camera-based data to determine different types of signals. For instance, the signals may include one or combinations of: (1) intention/motor planning (e.g., a voluntary motion state signal), (2) frustration/satisfaction with the most recently rendered output (e.g., a selection signal, such as a satisfaction or frustration with an output signal), and (3) optionally, activity indicative of prolonged frustration (e.g., a frustration state).

The other sensor(s) 102C may include heart rate sensors, EMG sensors, and the like. The other sensor(s) 102C may supplement or be used in addition to the EEG and/or the camera-based data. In some cases, the other sensor(s) 102C may assist the user device in performing the same or different function. In some cases, the other sensor(s) may provide (optional) "hotkey" functions. For instance, the other sensor(s) 102C may be placed on facial muscles, jaw, or neck of a user to record EMG signals to perform custom key bindings or modify other functions in response to the user performing a particular gesture. For instance, a clench right side of jaw, twitch eyebrow, press tongue to roof of mouth, and the like, may be mapped to different functions.

The stylus 106 may a stylus device (e.g., pen or pencil shaped). In some cases, the stylus 106 maybe a peripheral input device. The stylus 106 may generally include a pen/stylus component and a digitizer component. The pen/stylus component may be configured to collect real-time pressure data. For instance, the real-time pressure data may include XY tilt, rotation, and more (e.g., based on pressure from a pressure sensor). The digitizer component may be configured to collect real-time XY position data of the pen/stylus. The real time pressure data may be summed with the XY position data to make a pen stroke.

In some cases, the physical hardware of the stylus 106 and the firmware that provides functionality may be provided by an OEM of each stylus 106. In some cases, the system of the present disclosure may be intended to be stylus 106 ambivalent: pen stroke data may be intended for collection as much as possible from a standardized software layer on a host machine for processing (e.g., a user device).

In some cases, the stylus 106 may interact with a touch display (pressure, capacitive, and the like) of a user device, such as a user interface 202. In some cases, the stylus 106 may be wirelessly (e.g., WIFI, Bluetooth and the like) or wired (e.g., USB, ethernet, and the like) connected to the user device 104. In this manner, the stylus 106 may provide the real-time pressure and XY position data to the user device 104. In some cases, the user interface 202 may (instead or in addition) determine the real-time pressure and XY position data. In some cases, the stylus 106 may be passive, and the user interface 202 may solely determine the real-time pressure and XY position data.

The network(s) 110 may include one or more local networks, private networks, enterprise networks, public networks (such as the internet), cellular networks, and satellite networks, to connect the various devices in the environment 100. Generally, the various devices of the environment 100 may communicate over network(s) 110 using, e.g., network communication standards that connect endpoints corresponding to the various devices of the environment 100.

The server 112 may be a computer, a server or set of servers, a cloud system, or a combination of the foregoing. The server 112 may provide software and/or software updates to one or more components of the environment 100, such as the stroke engine 206 of the user device 104.

User Device

Figure 2:
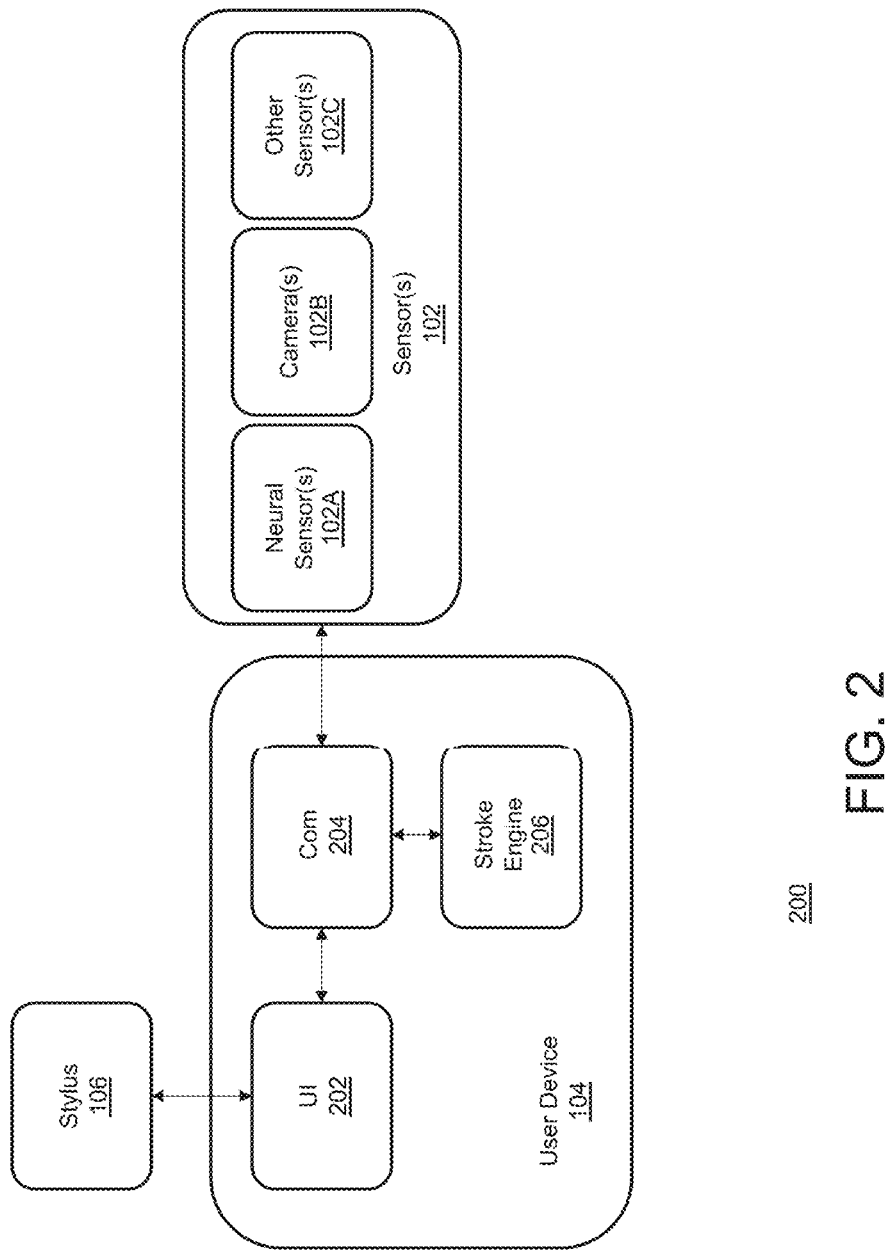
FIG. 2 depicts a block diagram schematically showing features of a user device for an assistive brain computer interface.

FIG. 2 depicts a block diagram 200 schematically showing features of a user device 104 for an assistive brain computer interface. The features of FIG. 2 may apply to any of FIG. 1, 3, 4, 5 or 6. The user device 104 may include a user interface 202, a communication module 204, and a stroke engine 206.

The user interface 202 may include at least a display. In some cases, the user interface 202 may include a digital interface for the stylus 106 (e.g., a touch interface display, pad, digital paper, and the like). In some cases, the display may be formed with the digital interface. In some cases, the display may be a separate device (or part of a same physical device) from the digital interface. The user interface 202 may generate stroke data and transit the stroke data to the stroke engine 206. In some cases, the stylus 106 may transmit parts of the stroke data via the communication module 204, while the user interface 202 may transmit other parts of the stroke data to the stroke engine 206.

The communication module 204 may be a wired or wireless communication module to route data from the sensor(s) 102 to the stroke engine 206. In some cases, the user interface 202 may route data via communication module 204 to the stroke engine 206, or the user interface 202 may route data directly to the stroke engine 206 (e.g., without using the communication module 204).

The stroke engine 206 may be a software interface to process the data received from the stylus 106, the user interface 202, and/or the sensor(s) 102. As discussed herein, the stroke engine 206 may generate renders of strokes based on stroke data, and sensor data.

The stroke engine 206 may be a multi-input feedback summing and decision software to process incoming data (e.g., sensor data and stroke data) and output renders of strokes. For instance, the stroke engine 206 may interface with dynamic rendering APIs, communicate with GTK+ drivers, and optionally hook to existing hardware drivers, implement a miniHID driver/filter driver, or implement a plugin to the design software utilizing the software's APIs. In some cases, the stroke engine 206 may avoid rewriting existing hardware drivers for the stylus 106.

In some cases, the stroke engine 206 may implement a USB intercept device for the stylus 106 that support the connection and to modify stroke packets before they reach the user device 104, rather than after the user device 104 has received the stroke packets.

The stroke engine 206 may generate the renderings of strokes based on one or more inputs. For instance, the stroke engine 206 may process EEG/camera data to determine a voluntary motion state. In some cases, the stroke engine 206 may process frequency domain intensity information (of the EEG data) to determine user intention to act. For instance, the frequency domain intensity information may be designed in accordance with training. The training may associate motor planning or voluntary intention with types of signal characteristics.

For instance, the stroke engine 206 may process EEG/camera data to determine a selection signal. In some cases, the stroke engine 206 may process instantaneous and asynchronous state transition or falling/rising edge (of the EEG data). For instance, the stroke engine 206 may associate a sudden change from the last state to be indicative of the user reacting to visual feedback that is being presented. In some cases, the stroke engine 206 may use instantaneous raw voltage of EEG and/or a significant deviation or above threshold rate change of the most recent EEG frequency bin(s) from a computed model of prior intensity data.

For instance, the stroke engine 206 may process EEG/camera data to determine a frustration state. In some cases, the stroke engine 206 may process frequency domain intensity information (of the EEG data) to (e.g., coarsely) recognize that the user is frustrated with renderings.

In some cases, the stroke engine 206 may receive stroke data and render the stroke data (with no or minimal filtering). For instance, the stroke engine 206 may receive serialized data transmitted from stylus 106, generate the render, and display the render on the user interface 202. In these cases, the stroke engine 206 may modify the stroke/render of the stroke based on EEG feedback and/or facial feedback, and the like.

In some cases, the stroke engine 206 may process EEG signals to pre-modify or post-modify stroke/render of the stroke. The raw EEG signal extracted from the neural sensor(s) 102A on the user may be voltages sampled over a set time intervals. The raw EEG signal that is collected by the EEG sensor(s) 102A may then be filtered/processed such that normalized intensity information regarding several different spectral bands is captured in a discrete time window (e.g., a kernel). The mathematical operations underlying the separation and treatment of complex frequency components from a signal may be processed in accordance with Fourier transform (FT) and FT expansions (fractional FT, STFT, DFT, FFT, DTFT, wavelets, spectral density estimation, etc.).

For instance, the EEG signal may contain a recognizable signature that is indicative to be representative of voluntary motion or the imminent intent to make an input stroke. In some cases, this signature may be detectable by thresholds, particularly in the theta band frequency. In some cases, this signature may be detectable by models derived from pre-processed canonical correlation analysis. In some cases, this signature may be detectable by principal component analysis (PCA) informed models. In some cases, this signature may be detectable by one or types of machine learning models. For instance, the machine learning models may include regression models, CNN, autoencoders, and other fast neural net or ML informed models of size constrained nodes/components/parameters. In some cases, the implementation may involve a hash table and adaptive Kalman filters. This signature may be referred to as the voluntary motion state. The voluntary motion state may be anticipated to exist when input is being given. Restated, the voluntary motion state may indicate a current action (e.g., user is making a stroke) or before the user is taking an action (e.g., the intention to draw/make input imminently).

The EEG signal may also contain a recognizable signature that is indicative to be representative of instantaneous satisfaction or frustration with a presented rendering of a stroke. This signature may be time sensitive to the context of information that is visually rendered to the user. Thus, the signature may be treated as a selection signal that is asynchronously raised. The signature of the selection signal may be informed by a threshold crossing in one or more frequency bands, including the theta band, and a Kalman filter or an adaptation thereof (Alpha-Beta Filter, FKF, HKF, AKF, SKF, KAF, etc.) or a similar state estimation type approach. For instance, as the user interacts with the system, a set of past outputs may accumulate and the set of past outputs may be used to update a model for anticipating a future output. In some cases, a rules-based approach may limit the incorporation of outputs that are detected to be indicative of a selection signal and limit the length of a historical dataset to mitigate drift. In some cases, the ability to export a historical output model to use as an initialization point for a future session or fine tuning may be incorporated. When a deviation in the most recent output is beyond a specified limit, and the deviation occurs after the presentation of a new rendering (within a range of milliseconds, such as ~12-24 msec), the deviation may be treated as a result of the user responding to a newly presented stimulus (e.g., a rendering).

Similarly, camera data may approximate one or more of the above EEG states or satisfaction/frustration determinations. Based on facial analysis or eye tracking, an intention to make an input stroke may be determined, or a user's satisfaction or frustration may be extracted from the camera data.

The stroke engine 206 may use the EEG data and/or camera data in various methods to modify (pre or post) a rendering of a stroke, as discussed herein. Thus, the stroke engine 206 may use user state or feedback to modify (or not) a stroke.

Flow Diagram

Figure 3:
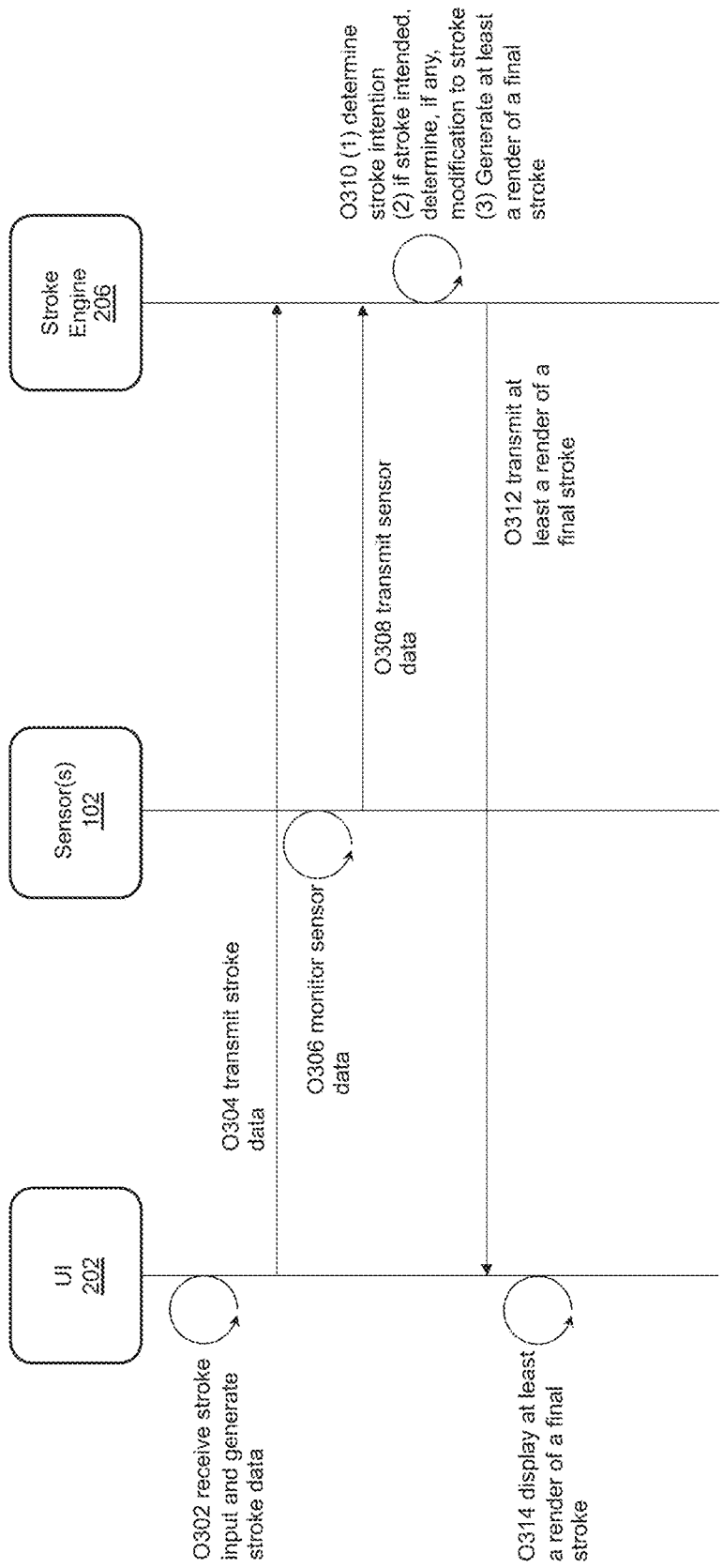
FIG. 3 depicts a flow diagram schematically showing features of a stroke engine for an assistive brain computer interface.

FIG. 3 depicts a flow diagram 300 schematically showing features of a stroke engine for an assistive brain computer interface. The features of FIG. 3 may apply to any of FIG. 1, 2, 4, 5 or 6. The flow diagram 300 may start at operation O302, where the user interface 202 may receive a stroke input and generate stroke data. For instance, the user interface 202 may sense the stylus 106 interact with a touch display of the user interface 202 and/or stylus data from the stylus 106. The user interface 202 may generate stroke data based on the interaction with the touch display of the user interface 202 and/or the stylus data from the stylus 106. The stroke data may be pressure data and/or XY data of the stylus 106.

At operation O304, the user interface 202 may transmit the stroke data to the stroke engine 206. The stroke engine 206 may receive the stroke data from the user interface 202.

At operation O306, the sensor(s) 102 may monitor sensor data. For instance, the neural sensor(s) 102A may sense EEG data via contacts on a user (e.g., on a head of a user), the camera(s) 102B may record images of eyes/face, and the like. The sensor(s) 102 may perform some functions onboard the sensor(s) 102, such as feature extractions, classifications, determinations, and the like (collectively, "parameters"). For instance, the sensor(s) 102 may determine signal classifications of EEG signals, facial reactions, or vectors for where an eye is looking, and the like.

At operation O308, the sensor(s) 102 may transmit the sensor data (and any parameters) to the stroke engine 206. The stroke engine 206 may receive the sensor data (and any parameters) from the user interface 202.

At operation O310, the stroke engine 206 may generate a render of the stroke based on the sensor data and the stroke data. For instance, the stroke engine 206 may (1) determine a stroke intention based on the sensor data; (2) if a stroke was intended, determine, if any, modification to the stroke based on sensor data and/or stroke data, and (3) generate at least a render of a final stroke based on sensor data, stroke data, and, if any, modification(s). In some cases, the stroke engine 206 may generate an initial render (e.g., as corresponding to the stroke data) and provide the initial render for display.

At operation O312, the stroke engine 206 may transmit at least a render of a final stroke. In some cases, the stroke engine 206 may provide the initial render. In these cases, the stroke engine 206 may wait for further sensor data to determine modifications and generate the final stroke render (e.g., based on dissatisfaction of the initial stroke render).

At operation O314, the user interface 202 may display at least the render of the final stroke. As discussed herein, in some cases, the user interface 202 may display the initial stroke render before further sensor data is received, and the final render is generated and displayed. However, in some cases, the user feedback (e.g., via EEG signals) may be used without displaying the initial stroke render.

Example Strokes

Figure 4:
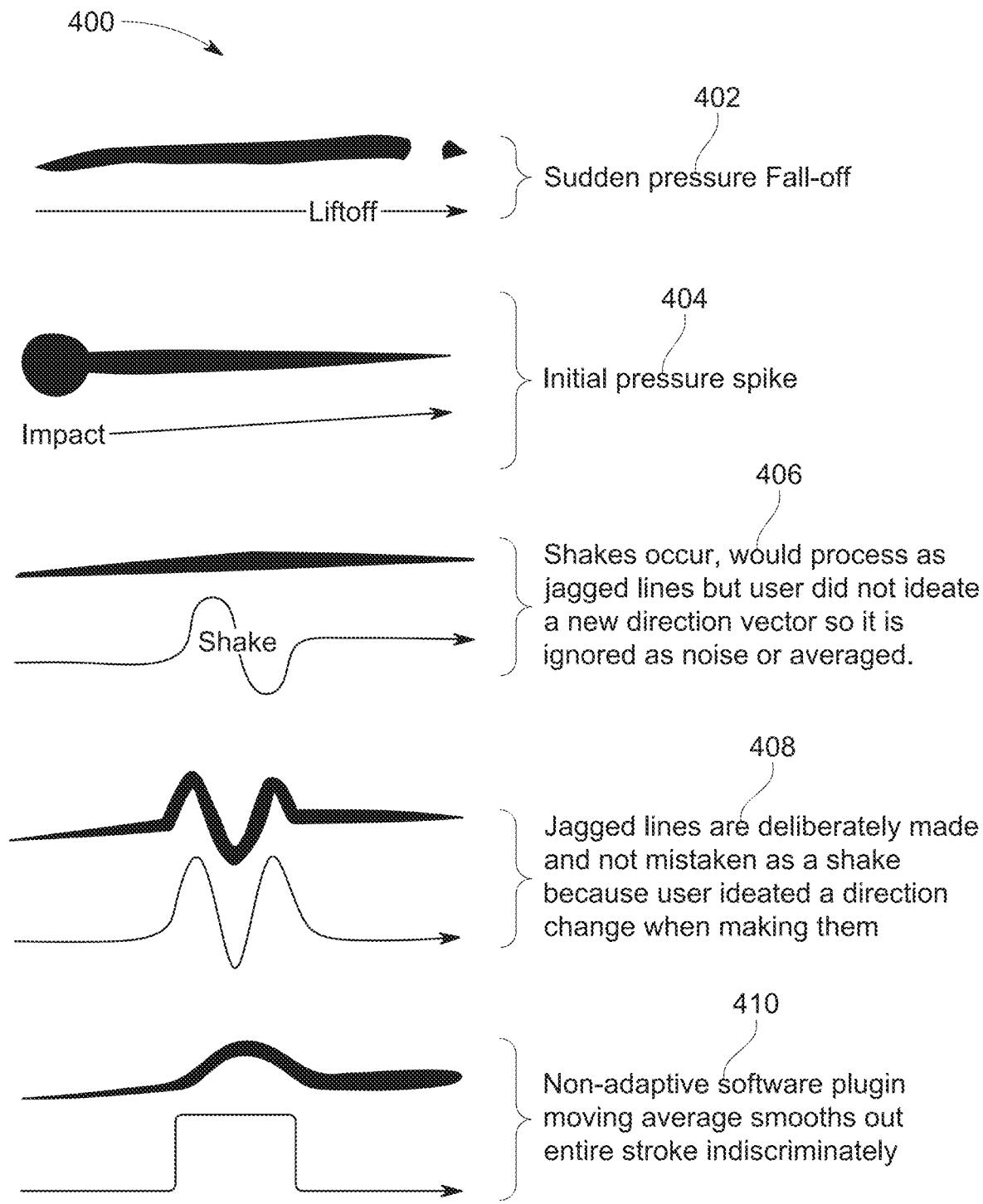
FIG. 4 depicts a graphics for different types of strokes for an assistive brain computer interface.

FIG. 4 depicts a graphics for different types of strokes for an assistive brain computer interface. The features of FIG. 4 may apply to any of FIG. 1, 2, 3, 5 or 6. The different types of strokes may include a first stroke 402, a second stroke 404, a third stroke 406, a fourth stroke 408, and a fifth stroke 410. While FIG. 4 depicts example different types of strokes, the stroke engine 206 and systems of the present disclosure may process and modify others not depicted in this disclosure.

The first stroke 402 may represent a sudden pressure fall-off. The stroke engine 206 may determine (1) intention to draw the first stroke 402 and/or (2) satisfaction with the first stroke 402. The stroke engine 206 may determine to modify the first stroke 402 based on the intention (or not) or the satisfaction (or not) with the first stroke 402. The stroke engine 206 may have preset actions (rewind, present options, undo, etc.) based on the user state, feedback, and the like.

The second stroke 404 may represent an initial pressure spike. The stroke engine 206 may determine (1) intention to draw the second stroke 404 and/or (2) satisfaction with the second stroke 404. The stroke engine 206 may determine to modify the second stroke 404 based on the intention (or not) or the satisfaction (or not) with the second stroke 404. The stroke engine 206 may have preset actions (rewind, present options, undo, etc.) based on the user state, feedback, and the like.

The third stroke 406 may represent a shake during the stroke. The stroke engine 206 may determine (1) intention to draw the third stroke 406 and/or (2) satisfaction with the third stroke 406. The stroke engine 206 may determine to modify the third stroke 406 based on the intention (or not) or the satisfaction (or not) with the third stroke 406. The stroke engine 206 may have preset actions (rewind, present options, undo, etc.) based on the user state, feedback, and the like. In the case depicted in FIG. 4, the stroke engine 206 determined the user did not ideate a new direction vector, so the shake during the stroke was ignored as noise or averaged. For instance, the system may determine that the user state indicates satisfaction with the third stroke 406 (as removing the shake noise, or averaging/smoothing), and leave the rendering of the third stroke 406 as rendered.

The fourth stroke 408 may represent jagged lines. The stroke engine 206 may determine (1) intention to draw the fourth stroke 408 and/or (2) satisfaction with the fourth stroke 408. The stroke engine 206 may determine to modify the fourth stroke 408 based on the intention (or not) or the satisfaction (or not) with the fourth stroke 408. The stroke engine 206 may have preset actions (rewind, present options, undo, etc.) based on the user state, feedback, and the like. In the case depicted in FIG. 4, the stroke engine 206 determined the user ideated a direction change when making the stroke, so the jagged lines are not smoothed or ignored as noise. Likewise, the system may determine that the user state indicates satisfaction with the fourth stroke 408 (as jagged lines are not smoothed or ignored as noise), and leave the rendering of the fourth stroke 408 as rendered.

The fifth stroke 410 may represent a non-adaptive software that merely smooths the entire stroke. In this case, the non-adaptive software does not consider the intention (or not) or the satisfaction (or not) with respect to the fifth stroke 410. Thus, users may be frustrated by the experience of the non-adaptive software.

Flowchart of Stroke Engine

Figure 5:
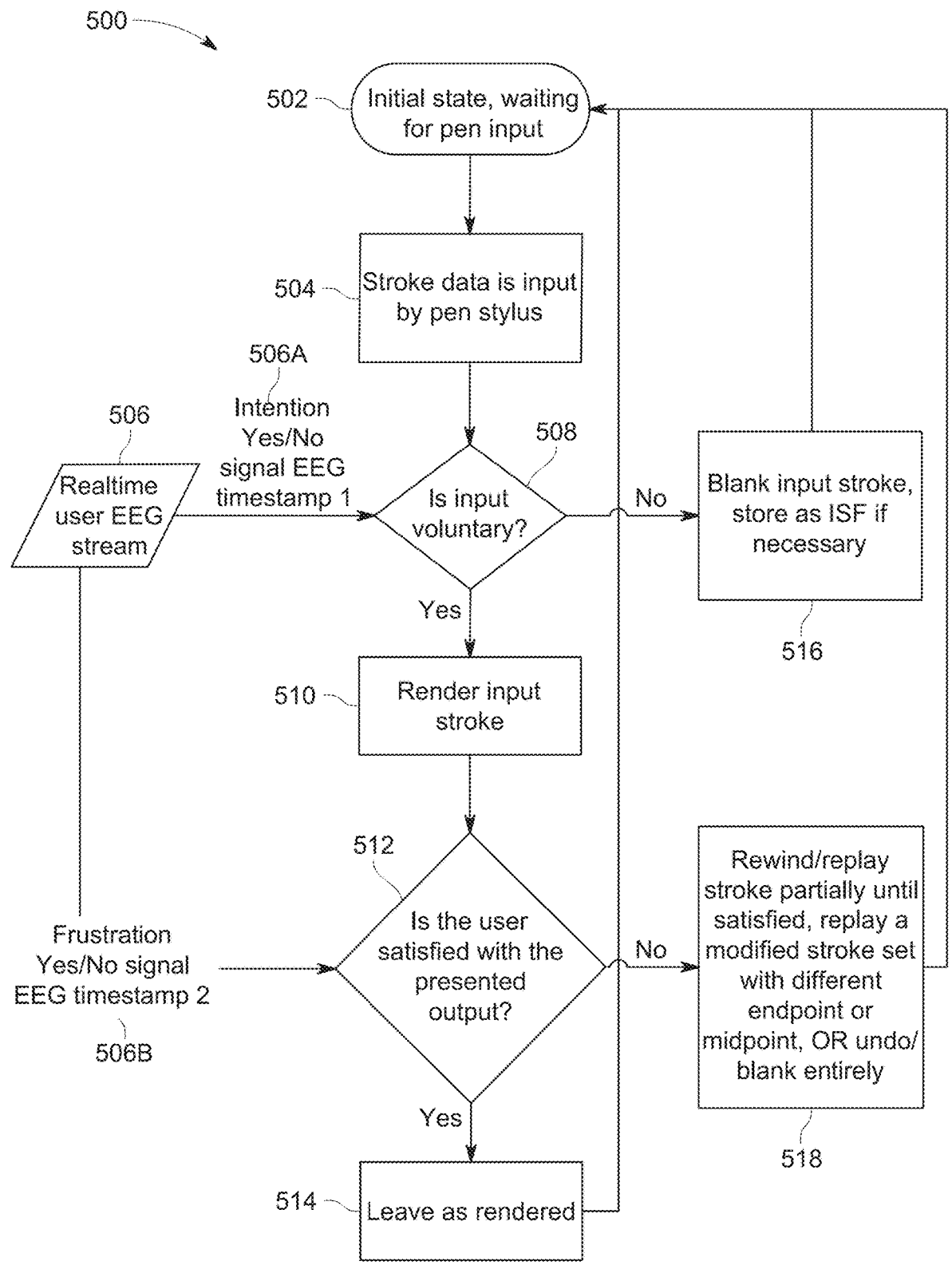
FIG. 5 depicts a flowchart of an exemplary method for an assistive brain computer interface.

FIG. 5 depicts a flowchart 500 of an exemplary method for an assistive brain computer interface. The features of FIG. 5 may apply to any of FIG. 1, 2, 3, 4, or 6. The flowchart 500 may be performed by the stroke engine 206 or any other device or system herein; for ease of reference, the stroke engine 206 will be referred to as the executing device of the method.

The flowchart 500 may start at block 502, where stroke engine 206 may be in an initial state waiting for a stylus/pen input.

At block 504, the stroke engine 206 may receive stroke data. For instance, the user interface 202 and/or the stylus 106 may provide data to the stroke engine 206 for a stroke of a user.

At block 506, the stroke engine 206 may receive a real-time user EEG stream from the neural sensor(s) 102A. For instance, the communication module 204 may relay a stream of EEG packet from the neural sensor(s) 102A to the stroke engine 206. In some cases, the stroke engine 206 (or the neural sensor(s) 102A) may classify a portion of the EEG stream as an intention signal 506A (e.g., at timestamp 1) and/or a frustration signal 506B (e.g., at timestamp 2).

At block 508, the stroke engine 206 may determine whether the stroke of the user was intentional. For instance, the stroke engine 206 may determine a timestamp of an intention signal 506A corresponds (e.g., is within a threshold time of) to a particular stroke (that corresponds to stroke data with a stroke timestamp).

In the case that the intention signal 506A indicates the stroke was intended (block 508: Yes), the stroke engine 206 may proceed to block 510. At block 510, the stroke engine 206 may render an initial stroke for the stroke input (e.g., corresponding to unmodified, or standard modified stroke data). For instance, the stroke engine 206 may cause the user interface 202 to display the render of the initial stroke (e.g., in near real time).

At block 512, the stroke engine 206 may determine whether the user is satisfied with the initial stroke. For instance, the stroke engine 206 may determine a timestamp of an frustration signal 506B corresponds (e.g., is within a threshold time of) to a particular display of the render of the initial stroke (that corresponds to display data with a timestamp).

In the case that the frustration signal 506B indicates the user is satisfied (block 512: Yes), the stroke engine 206 may proceed to block 514. At block 514, the stroke engine 206 may leave the render of the initial stroke as rendered (e.g., does no further modification to the render). The stroke engine 206 may then return to block 502.

In the case that the intention signal 506A indicates the stroke was not intended (block 508: No), the stroke engine 206 may proceed to block 516. At block 516, the stroke engine 206 may blank the stroke input by the user (e.g., not render it) and, optionally, store it as raw data (e.g., in ink serialized format, ISF). The stroke engine 206 may then return to block 502.

In the case that the frustration signal 506B indicates the user is not satisfied (block 512: No), the stroke engine 206 may proceed to block 518. At block 518, the stroke engine 206 may perform one or more actions.

The one or more actions may include one or combinations of: a rewind action, a modify action, and/or an undo action.

The rewind action may rewind the stroke partially until the user EEG signal indicates satisfied. For instance, the stroke engine 206 may generate a set of different stroke renders (starting from last in time to start of stroke) and cause the user interface to display each in series. At the same time, the stroke engine 206 may monitor the EEG signal/classification for a satisfaction signal, thereby selecting a version based on the EEG signal.

The modify action may generate and display a modified stroke set with different endpoint or midpoint. In some cases, the system may display several options of modified strokes and the user may select one. In some cases, the system may display options in sequence and based on the user EEG signal indicating satisfied, select that option.

The undo action may undo/blank the stroke entirely. In some cases, the undo action may be selected based on a signal characteristic (e.g., large dissatisfaction of the stroke rendering).

The stroke engine 206 may then return to block 502.

Computer System

Figure 6:
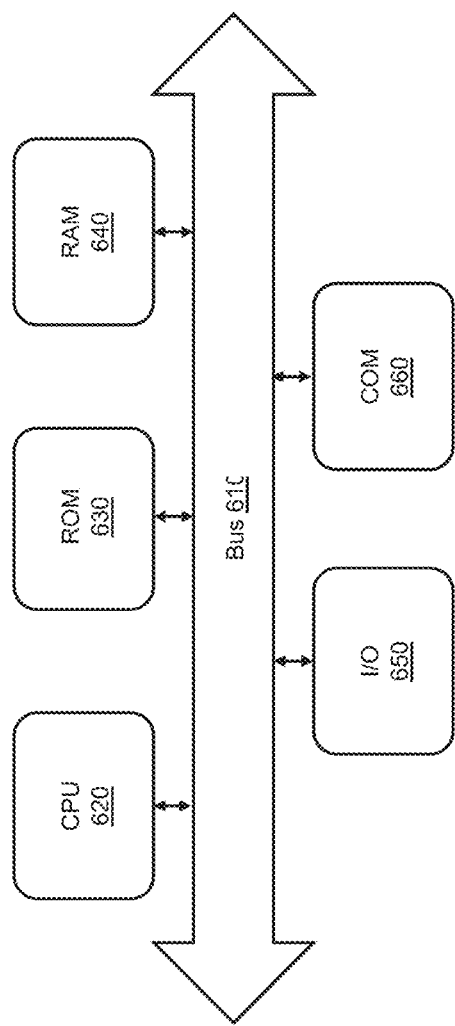
FIG. 6 depicts an example system that may execute techniques presented herein.

FIG. 6 depicts an example system that may execute techniques presented herein. FIG. 6 is a simplified functional block diagram of a computer that may be configured to execute techniques described herein, according to exemplary cases of the present disclosure. Specifically, the computer (or "platform" as it may not be a single physical computer infrastructure) may include a data communication interface 660 for packet data communication. The platform may also include a central processing unit ("CPU") 620, in the form of one or more processors, for executing program instructions. The platform may include an internal communication bus 610, and the platform may also include a program storage and/or a data storage for various data files to be processed and/or communicated by the platform such as ROM 630 and RAM 640, although the system 600 may receive programming and data via network communications. The system 600 also may include input and output ports 650 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In some cases, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Terminology

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Examples

Exemplary embodiments of the systems and methods disclosed herein are described in the numbered paragraphs below.

A1. A system for an assistive brain computer interface, the system comprising: a set of sensors, wherein the set of sensors are configured to obtain sensor data; a stylus configured to collect stroke data; and a user device configured to: receive the stroke data from the stylus and the sensor data from the set of sensors; generate renders of strokes based on the stroke data and the sensor data; and display the renders of the strokes to a user.

A2. The system of A1, wherein the set of sensors are configured to obtain different modalities of sensor data.

A3. The system of any of A1-A2, wherein the stroke data includes real-time pressure data and real-time XY position data.

A4. The system of any of A1-A3, wherein the user device is a personal computing device selected from the group consisting of a cell phone, a tablet, a laptop, a desktop computer, a virtual reality device, an augmented reality device, and a XR device.

A5. The system of any of A1-A4, wherein the set of sensors include a neural signal sensor configured to monitor and transmit real-time electrophysiological data (EEG data) of the user to the user device, and the user device is configured to determine, based on the EEG data, attention, intention, satisfaction of the user with the renders.

A6. The system of A5, wherein the neural signal sensor is a wearable EEG headset.

A7. The system of any of A1-A6, wherein the set of sensors includes a camera configured to obtain image(s) a face of a user, and the user device is configured to determine, based on the image(s), user attention, intention, satisfaction, and/or eye tracking.

A8. The system of any of A1-A7, wherein the stylus is a peripheral input device that includes a pen component configured to collect real-time pressure data and a digitizer component configured to collect real-time XY position data.

A9. The system of any of A1-A8, wherein the user device includes a stroke engine.

A10. The system of A9, wherein the stroke engine is a multi-input feedback summing and decision software configured to process the stroke data and the sensor data, and output the renders of the strokes.

A11. The system of A9, wherein the stroke engine is further configured to process EEG data and camera data to determine one or more signals, and the one or more signals include one or combinations of: (1) intention/motor planning, (2) frustration/satisfaction with the rendered output, and (3) activity indicative of prolonged frustration.

A12. The system of A9, wherein the stroke engine is further configured to generate an initial render of a first stroke and modify the initial render based on user feedback obtained from the sensor data.

A13. A method for operating an assistive brain computer interface, the method comprising: receiving stroke data from a user interface; receiving a real-time user EEG stream from a neural sensor; determining whether a stroke of a user was intentional based on the EEG stream; rendering an initial stroke for the stroke input if the stroke was determined to be intentional; determining whether the user is satisfied with the initial stroke based on the EEG stream; and modifying the initial stroke based on the determination of user satisfaction.

A14. The method of A13, wherein the stroke data includes pressure data and position data from a stylus interacting with a touch display of the user interface.

A15. The method of any of A13-A14, further comprising: receiving camera-based data from a camera, wherein the camera-based data includes user attention, intention, satisfaction, and eye tracking data, wherein the determination of user intention and user satisfaction is further based on the camera-based data.

A16. The method of any of A13-A15, wherein modifying the initial stroke includes one or more of: rewinding the stroke partially until the user EEG signal indicates satisfaction, generating and displaying a modified stroke set with different endpoint or midpoint, and undoing the stroke entirely.

A17. A system for an assistive brain computer interface, the system comprising: a set of sensors including at least a neural sensor; an input stylus; and a user device including a user interface and a stroke engine, wherein the user interface is configured to interact with the input stylus, and the stroke engine is configured to: receive stroke data from the user interface and/or the input stylus; receive a real-time user EEG stream from the neural sensor; determine whether a stroke of a user was intentional based on the EEG stream; render an initial stroke for the stroke input if the stroke was determined to be intentional; determine whether the user is satisfied with the initial stroke based on the EEG stream; and modify the initial stroke based on the determination of user satisfaction.

A18. The system of A17, wherein the set of sensors further comprises a camera, heart rate sensors, and/or EMG sensors.

A19. The system of A18, wherein the EMG sensors are placed on facial muscles, jaw, or neck of a user to record EMG signals to perform custom functions in response to the user performing a particular gesture.

A20. The system of A19, wherein the stroke engine is further configured to modify the initial stroke based on the EMG signals recorded by the EMG sensors.

Other aspects of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for an assistive brain computer interface, the system comprising:
a set of sensors, wherein the set of sensors are configured to obtain sensor data, wherein the sensor data comprises real-time electrophysiological data (EEG data) from a user;
a stylus configured to collect stroke data; and
a user device configured to:
receive the stroke data from the stylus and the sensor data from the set of sensors;
determine user intention to make a stroke input based on analysis of the EEG data;
determine user satisfaction or dissatisfaction with rendered stroke outputs based on analysis of the EEG data;
generate renders of strokes by modifying initial stroke renders based on (a) the user intention and (b) the user satisfaction or dissatisfaction; and
display the renders of the strokes to a user.

2. The system of claim 1, wherein the set of sensors are configured to obtain different modalities of sensor data.

3. The system of claim 1, wherein the stroke data includes real-time pressure data and real-time XY position data.

4. The system of claim 1, wherein the user device is a personal computing device that is a cell phone, a tablet, a laptop, a desktop computer, a virtual reality device, an augmented reality device, or a XR device.

5. The system of claim 1, wherein the set of sensors include a neural signal sensor configured to monitor and transmit the EEG data of the user to the user device, and the user device is configured to determine, based on the EEG data, attention, intention, satisfaction of the user with the renders.

6. The system of claim 5, wherein the neural signal sensor is a wearable EEG headset.

7. The system of claim 1, wherein the set of sensors includes a camera configured to obtain image(s) a face of a user, and the user device is configured to determine, based on the image(s), user attention, intention, satisfaction, and/or eye tracking.

8. The system of claim 1, wherein the stylus is a peripheral input device that includes a pen component configured to collect real-time pressure data and a digitizer component configured to collect real-time XY position data.

9. The system of claim 1, wherein the user device includes a stroke engine.

10. The system of claim 9, wherein the stroke engine is a multi-input feedback summing and decision software configured to process the stroke data and the sensor data, and output the renders of the strokes.

11. The system of claim 9, wherein the stroke engine is further configured to process the EEG data and camera data to determine one or more signals, and the one or more signals include one or combinations of: (1) intention/motor planning, (2) frustration/satisfaction with the rendered output, and (3) activity indicative of prolonged frustration.

12. The system of claim 9, wherein the stroke engine is further configured to generate an initial render of a first stroke and modify the initial render based on user feedback obtained from the sensor data.

13. A method for operating an assistive brain computer interface, the method comprising:
receiving stroke data from a user interface;
receiving a real-time user EEG stream from a neural sensor;
determining whether a stroke of a user was intentional based on the EEG stream;
rendering an initial stroke for the stroke input if the stroke was determined to be intentional;
determining whether the user is satisfied with the initial stroke based on the EEG stream; and
modifying the initial stroke based on the determination of user satisfaction.

14. The method of claim 13, wherein the stroke data includes pressure data and position data from a stylus interacting with a touch display of the user interface.

15. The method of claim 13, further comprising: receiving camera-based data from a camera, wherein the camera-based data includes user attention, intention, satisfaction, and eye tracking data, wherein the determination of user intention and user satisfaction is further based on the camera-based data.

16. The method of claim 13, wherein modifying the initial stroke includes one or more of: rewinding the stroke partially until the user EEG signal indicates satisfaction, generating and displaying a modified stroke set with different endpoint or midpoint, and undoing the stroke entirely.

17. A system for an assistive brain computer interface, the system comprising:
a set of sensors including at least a neural sensor;
an input stylus; and
a user device including a user interface and a stroke engine, wherein the user interface is configured to interact with the input stylus, and the stroke engine is configured to:
receive stroke data from the user interface and/or the input stylus;
receive a real-time user EEG stream from the neural sensor;
determine whether a stroke of a user was intentional based on the EEG stream;
render an initial stroke for the stroke input if the stroke was determined to be intentional;
determine whether the user is satisfied with the initial stroke based on the EEG stream; and
modify the initial stroke based on the determination of user satisfaction.

18. The system of claim 17, wherein the set of sensors further comprises a camera, heart rate sensors, and/or EMG sensors.

19. The system of claim 18, wherein the EMG sensors are placed on facial muscles, jaw, or neck of a user to record EMG signals to perform custom functions in response to the user performing a particular gesture.

20. The system of claim 19, wherein the stroke engine is further configured to modify the initial stroke based on the EMG signals recorded by the EMG sensors.

* * * * *